Jan. 7, 1930.  P. G. FRAZIER  1,742,589
ROTARY VALVE STRUCTURE
Filed Dec. 16, 1925  3 Sheets-Sheet 3
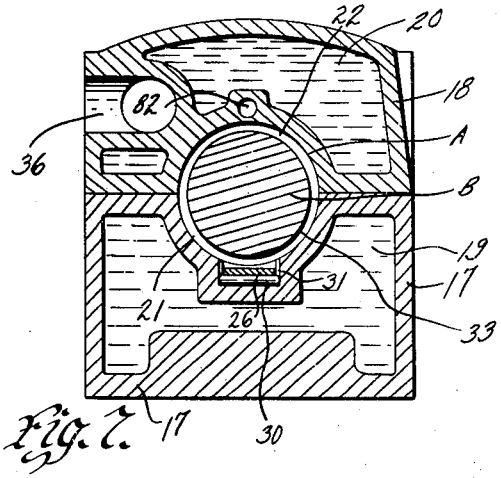
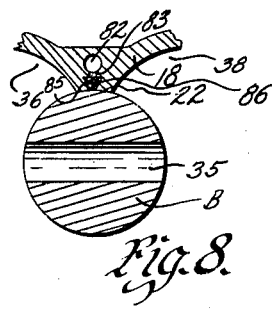
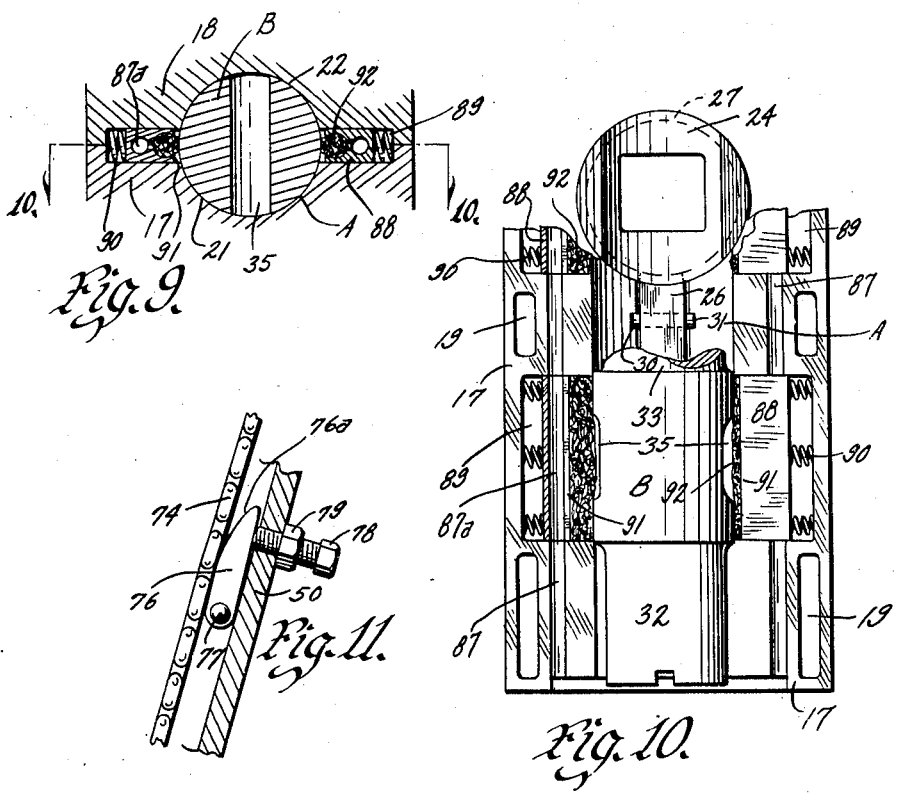
Witness
Inventor
Pearl G. Frazier
by Bair & Freeman Attorneys Patented Jan. 7, 1930

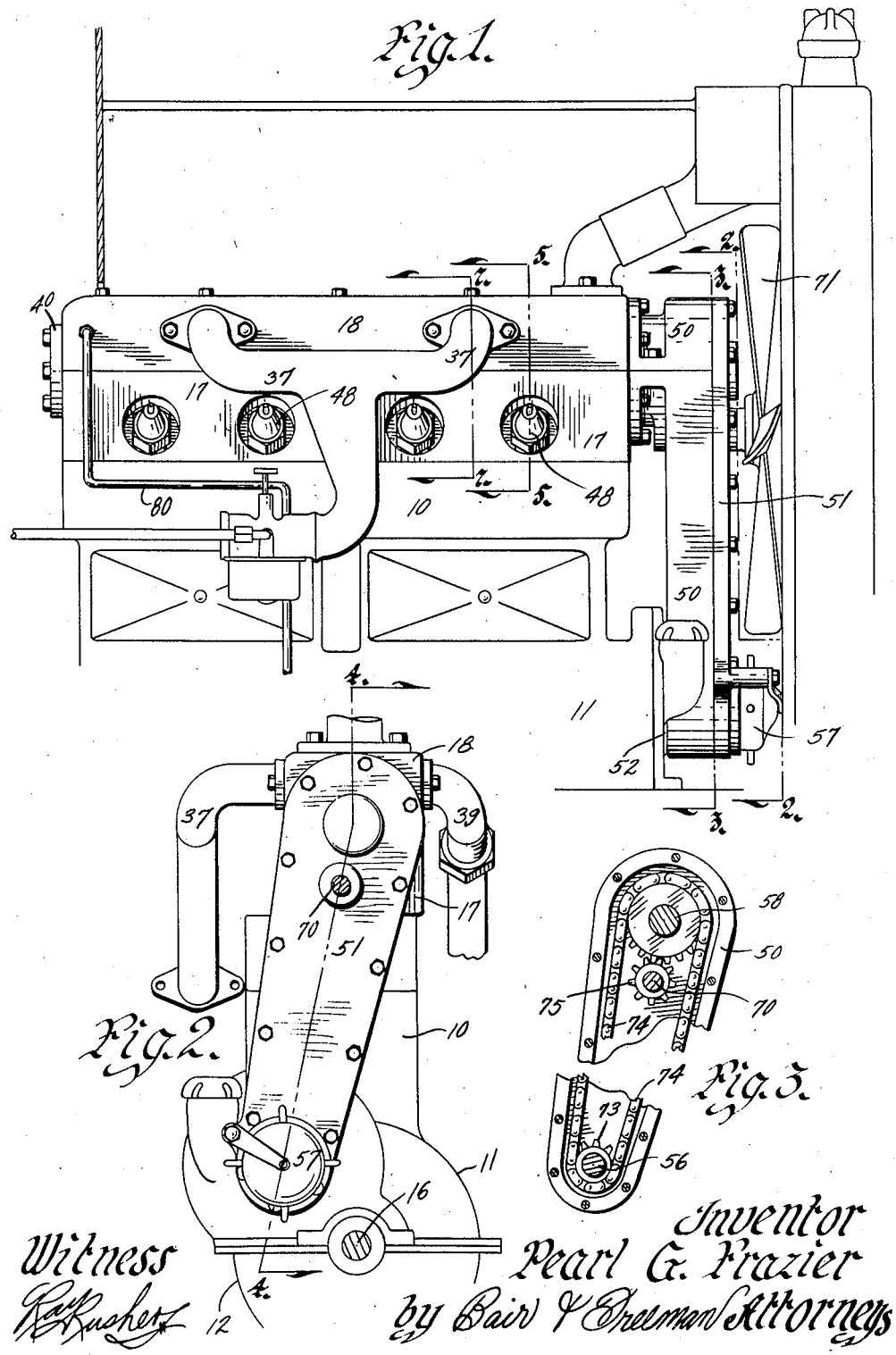

1,742,589

UNITED STATES PATENT OFFICE

PEARL G. FRAZIER, OF ANKENY, IOWA

ROTARY VALVE STRUCTURE

Application filed December 16, 1925. Serial No. 75,737.

My invention has to do with a rotary valve structure adapted for use with an internal combustion engine.

The purpose of my invention is to provide such a valve structure including a head of novel construction and arrangement having mounted therein a rotary valve and having adjustable bearing elements for providing for radial and longitudinal expansion and contraction of the valve.

Still another purpose is to provide in such a structure means for imparting rotation from a fixed shaft to the valve, said means including proper mechanism for connecting the rotary valve with a rotating shaft for allowing for the floating adjustment of the valve in such manner as to avoid binding of the parts and undue friction arising from slight variation in the position of the valve due to its expansion and contraction.

Another purpose of my present invention is to provide novel and effective oiling means for a rotary valve.

With these and other objects in view, my invention consists in the construction, arrangement and combination of the various parts of my rotary valve structure, whereby the objects contemplated are attained, as hereinafter more fully set forth, pointed out in my claims, and illustrated in the accompanying drawings, in which:

Figure 1 shows a side elevation of a motor vehicle engine equipped with a rotary valve structure embodying my invention.

Figure 2 shows a front elevation of the same partly in section taken on the line 2—2 of Figure 1.

Figure 3 is a vertical, detail, sectional view taken on the line 3—3 of Figure 1, parts being broken away.

Figure 7 is a detail, sectional view taken on the line 7—7 of Figure 1.

Figure 8 is a detail, sectional view through the valve taken on the same line as Figure 5, showing a slightly modified form of the oiling arrangement.

Figure 9 is a detail, sectional view of the valve illustrating another form of the oiling mechanism.

Figure 10 is a detail, sectional view taken on the line 10—10 of Figure 9, parts being broken away; and Figure 11 is a detail, sectional view illustrating the adjustable fiber tightener.

Figure 4:
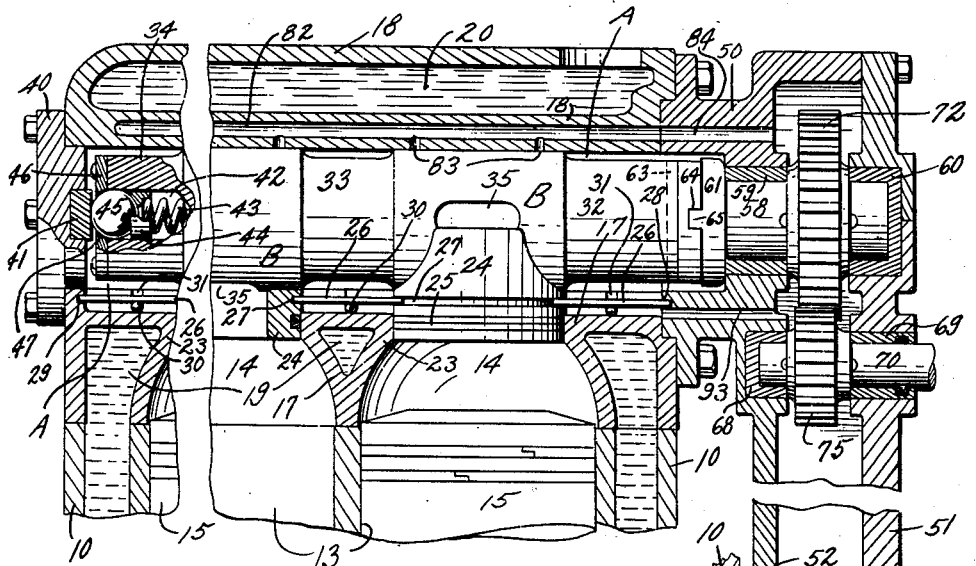
Figure 4 is a vertical, detail, sectional view taken on the line 4—4 of Figure 2.

In the drawings herewith in which I have assumed to illustrate a form in which my invention may be embodied without, however, intending to limit myself to the exact form of the structure disclosed, I have used the reference numeral 10 to indicate the engine block, having the crank case 11 with the removable lower part 12.

The engine block 10 is provided with a plurality of cylinders 13 and the ordinary water jacket structure 14.

In the cylinders 13 are the usual pistons 15 connected by ordinary mechanism with the crank shaft 16.

The head is made in two parts 17 and 18 divided horizontally and formed with the water jackets 19 and 20.

It will, of course, be understood that the lower half 17 of the head may be cast integral with the block 10 with such slight modifications as would occur to those skilled in the art.

Formed in the head is a valve casing A, the lower half of which indicated at 22, is formed in the upper part 18 of the head.

Figure 5:
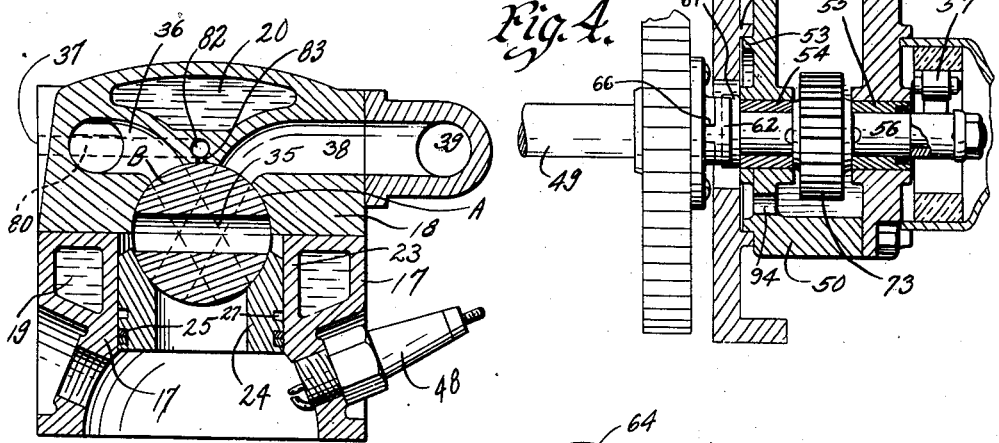
Figure 5 is a detail, sectional view taken on the line 5—5 of Figure 1.

Rotatably mounted in the valve casing A in the head of my engine is a rotary valve B. In the head above each cylinder 13 is a tubular neck or the like 23 (Figure 5).

In the necks 23 are received bearing shoes 24 preferably substantially similar to those shown in my Patent No. 1,557,245, issued October 13, 1925.

The lower parts of these shoes 24 are cylindrical and are provided with expansion rings 25 of ordinary construction similar generally speaking to the expansion rings on the pistons 15.

For yieldably holding the shoes 14 against the lower parts of the rotary valve B, I provide spring plates 26, each having one edge received in a recess 27 in the outer surface of the shoe 14.

The recess 27 also serves the function of an oil conductor and is preferably made to extend entirely around the shoe.

At the front and rear of the series of cylinders, the front and rear edges respectively of the plates 26 are received in recesses 28 and 29 in the valve casing or chamber. The valve casing is so arranged that the plates 26 normally stand spaced therefrom, except at their edges as shown in Figure 4.

Extending transversely under each plate 26 and resting on the lower part of the valve casing is a small roller 30, the ends of which are received in small slots 31 in the casing. (See Figures 4, 7 and 10.)

The intermediate plates 26 have their edges received in the recesses 27 of successive shoes 14.

The rotary valve B has reduced portions at its ends and between the successive cylinders as indicated at 32, 33, and 34.

The portions of the rotary valve, which are of larger diameter, fit the shoes 14 snugly.

For each cylinder, there is extended through the rotary valve a fuel intake and discharge passage 35. The passages 35 are arranged at such angles with relation to each other as to provide for intake of fuel and discharge of exhaust gases at the proper times in the operation of the engine, and assuming that the valve is geared for one-fourth timing and in such manner that it rotates one-half a revolution for each complete cycle of intake compression firing and exhaust operations.

The upper portion 18 of the engine head is provided on one side with a series of intake passages 36, which are arranged to communicate at the proper times with the respective valve passages 35 and at all times with the intake manifold 37.

The head portion 18 is provided on the other side with the exhaust passages 38 arranged to communicate at proper times with the valve passages 37 and at all times with the exhaust manifold 39.

It will be noted that the rotary valve is pressed upwardly at all times by the springs 26.

The parts are so arranged that when the springs are placed in position and the valve is installed, the springs are for example under slight tension.

The valve casing in the upper part of the head 18 is arranged with its bore slightly enlarged from its upper longitudinal, central line to its sides at diametrically opposite sides of the valve B and in quarter circle is preferably of such size that it is two-one-thousandths (2/1000ths) of an inch greater than the radial center of the valve to the side of the casing formed in the upper head, than from the diametrical center of the valve to the top of the casing.

This is done to properly provide for expansion.

At the rear end of the head member 18 is a cover plate 40. On the inside of the plate 40 is inset a hardened steel plate 41. In the adjacent end of the valve B is a recess 42 in which is received a coil spring 43.

A cylindrical spring seat 44 receives one end of the spring 43 on one side and forms a seat for a hardened steel ball 45 on the other side.

On the end of the valve B is a plate 46 in which is an opening 47 to permit the ball 45 to project through and against the plate 41. Thus the spring 43 bearing against the valve B and the ball 45 tends to yieldingly hold the valve B at the forward limit of its movement to expansion and contraction, and yet allows slight longitudinal contraction without permitting the valve to bind.

Spark plugs 48 may be set in the lower part 17 of the head, as shown for instance in Figures 1 and 5.

I will now describe the mechanism for operating the rotary valve B.

The engine is provided with the counter shaft 49 suitably driven from the crank shaft.

Bolted to the front end of the engine head is a gear casing member 50, which projects downwardly substantially below the head and is provided with a front cover plate 51.

At the front of the motor block, there may be provided an annular rib 52 arranged to co-act with a smaller annular rib 53 on the casing member 50 for holding the parts in rigid alignment.

Mounted in bushings 54 and 55 in the lower part of the casing member 50 and plate 51 is a valve and timer operating shaft 56 on the outer end of which is the timer 57.

A shaft 58 is mounted in the bushings 59 and 60 in the upper part of the casing members 50 and 51.

It will be remembered that owing to the manner of installing the rotary valve B and owing to its contraction and expansion, its central, longitudinal axis may vary slightly from true alignment with the similar axis of the shaft 58.

In order therefore to operate the rotary valve from the shaft 58 and to freely permit the floating movement of the valve B, so that no binding will occur, I have provided the following means for connecting the shaft 58 and the rotary valve B.

In order to provide a universal hook-up, I have provided a similar means for operatively connecting the shafts 49 and 56.

Figure 6:
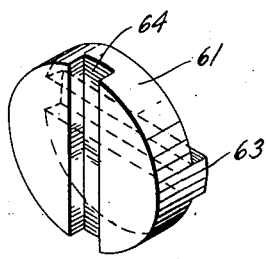
Figure 6 is a perspective view of one of the shaft connecting members.

A disc or discs 61 and 62 are provided, each on one side, with a diametrical rib 63 and on the other side with a diametrical groove 64, the groove and rib in each instance being arranged at right angles to each other, as shown in Figure 6.

The valve B and the shaft 49 are provided in their ends with the grooves 65 and 66 respectively to receive the ribs 63 of the discs 61 and 62. The shafts 58 and 56 are provided with ribs 67 received in the respective grooves 64 of the discs 61 and 62.

It will thus be seen that a universal joint connection is provided between the valve B and the shaft 58 which will allow for the floating movement of the valve without interfering with the proper journaling of the shaft 58 or causing the parts to bind when the valve is operated from the shaft.

In view of the fact that practically all makers of rotary valves have experienced difficulties in the attempt to provide for the expansion and contraction of the rotor and in view of the further fact that in attempting to solve this problem, it has been attempted to permit some floating movement of the rotor, and in view of the additional fact that when this solution of the problem was worked out a new difficulty arose in the attempt to operate the rotor from a fixed shaft, the importance of the structure just heretofore described will be readily appreciated.

In this connection, I desire to say that it is not my intent to limit myself to the particular type of universal joint connection or means for connecting a floating shaft with a shaft mounted in fixed bearings, as disclosed in my drawings, but on the other hand, it is my purpose to cover by my claims, any equivalent structures for connecting the rotor and the shaft, by which the desirable result under consideration could be attained.

Mounted in bushings 68 and 69 in the casing member 50 and the plate 51 is a shaft 70, which projects forwardly from the plate 51 and has mounted on its forward end the ordinary fan 71. On the shafts 58 and 56 are sprockets 72 and 73 on which travels the so-called silent chain 74 for transmitting rotation from the shaft 67 and the shaft 58 and therethrough to the rotary valve.

The fan shaft 70 may be operated in any suitable way. As here shown, it is provided with a gear 75 cut to mesh with the sprocket 72. The casing, comprising the members 50 and 51, may be filled with lubricant so that the parts are run in oil.

For properly tensioning or tightening the chain 74, I provide, as shown in Figure 11, on the inside of the casing member 50, a fiber block 76, pivoted as at 77. An adjusting screw 78 is mounted in the wall of the casing 50 to bear against the swinging end of the block 76 and is provided with a lock nut 79.

The face of the block 76, which is designed to be pressed against the chain, is beveled as at 76ª.

By adjusting the screw 78 and block 76, the tension on the chain 74 may be regulated as may be desired.

I have provided in connection with the rotary valve as herein described what I believe to be a novel oiling system.

This involves generally speaking the provision of a passage in the valve casing alongside the valve through which oil may be passed with a free flow from a point or points at approximately the rear end of the casing to the front thereof, where it discharges into the gear casing 50.

There is also provided in the casing spaced from the passage just mentioned, a groove to receive an absorbent strip, and short by-passes afford communication between the passage and the groove.

There is thus allowed a free flow of oil past the by-passes to the felt or other absorbent, so that oil will be supplied substantially as needed.

This general system may be embodied in several forms, some of which are here illustrated.

For example, I have shown, in Figure 1, a pipe 80, which is designed to receive oil from the pump and to supply it to a passage in the upper part of the head, which passage is indicated at 82 in Figure 4. A number of by-passes 83 lead from the passage 82 to the interior of the casing for the rotary valve.

At its front end, the passage 82 is connected by a passage 84 with the interior of the casing 50.

In Figure 8, I have shown in the head 18 a groove 85 in which is a strip of absorbent material 86. The by-passes 83 communicate with the groove 85. Oil will flow freely through the passage 82 to the gear casing at the front of the rotary valve, and enough oil for the purpose will be supplied through the by-passes 83 to the absorbent 86. As shown in Figure 4, the absorbent may be omitted, and the groove for containing it may be omitted.

In Figures 9 and 10, I have shown passages 87, which are intended to be connected with the pipe 80 and extend alongside the valve in the casing therefor. They may be arranged as shown in Figure 8, except that they are at the side of the valve instead of at the top.

Adjustable blocks 88 (Figure 9) may be provided in recesses 89. The blocks 88 have the passages 87ª for oil and are yieldingly pressed toward the valve by means of the springs 90. The blocks 89 may have grooves 91 to contain the absorbent strips 92.

At the present time, I think I prefer the form of the oiling system in which a continuous passage is provided through the engine head, an absorbent receiving groove is provided adjacent to the rotary valve, and by-passes 83 are provided for connecting the passage and groove.

In any form employed, oil is supplied to one end of the passage and at the other end is discharged to the casing 50, and thence through holes 93 and 94 to the crank case.

A number of important advantages arise from this method of oiling. It is, of course, to be noted in the first place, that where, as in this case, the rotor of the valve turns only one revolution for four revolutions of the crank shaft, there is not the likelihood of heating due to friction, which would exist if the rotor turned more rapidly.

One great difficulty, which has usually been faced where the rotary type of valve has been employed has been due to the impossibility of providing a wholly satisfactory oiling system. Where the method here disclosed is used, the absorbent material containing the oil releases that oil to the rotor only as the surface of the rotor touches the oil or absorbent containing it. Thus the full surface of the rotor is oiled, and yet the ports are permitted to pass over the oil container without getting any substantial amount of oil into the ports.

Generally speaking, the absorbent releases oil to the rotor only where the surface of the rotor touches the container, and it is thus obvious that the oil will not get into the ports in any substantial amount.

I have found that while this method supplies an ample amount of lubricant for the purpose, it is particularly efficient in avoiding over-oiling of the valve. Over-oiling of the valve is a thing which it is highly desirable to avoid, because where it exists, there is a great waste of oil, and a burning of oil, which causes smoke.

It is, of course, desirable to avoid getting smoke or oil into the ports.

I have thus provided an oiling system which affords an ample supply for all necessities of the rotor and yet assures the operation of the valve without over-oiling, and its undesirable consequences.

It is not my purpose to limit the structure herein shown necessarily to an internal combustion engine, because I believe it can be used with steam and possibly with other types of engines.

It is likewise my purpose to cover by my claims any analogous uses to which my valve structure and oiling system may be put, and to cover any modified forms of structure or use of mechanical equivalents, which may be within the scope of my invention, as here disclosed.

I claim as my invention:

1. In a device of the class described, an engine body having a cylinder and having a head provided with a casing, a rotary valve mounted in said casing, yieldably mounted bearing elements for said valve comprising slidable shoes, plates bearing on said shoes, and cross rollers supported under said plates between their ends.

2. In a device of the class described, an engine body having a head provided with a valve casing, a rotary valve mounted in said head, a passage in said head substantially parallel to said valve, a gear casing at one end of said head, said passage being arranged to discharge into said gear casing, a groove in said valve casing adjacent to the valve, absorbent material contained in said groove, said head having by-passes from said passage to said groove, means for supplying lubricant to said passage, and spring-pressed blocks bearing on said lubricant absorbent material.

3. In a device of the class described, an engine body having a head provided with a valve casing, a rotary valve mounted in said head, a passage in said head substantially parallel to said valve, a gear casing at one end of said head, said passage being arranged to discharge into said gear casing, a groove in said valve casing adjacent to the valve, absorbent material contained in said groove, said head having by-passes from said passage to said groove, means for supplying lubricant to said passage, and spring-pressed blocks bearing on said lubricant absorbent material, having passages therein forming part of said lubricant passage.

Des Moines, Iowa, December 1, 1925.

PEARL G. FRAZIER.